United States Patent
Danesi et al.

(10) Patent No.: US 9,311,358 B2
(45) Date of Patent: Apr. 12, 2016

(54) SMART CACHE COMPONENT FOR DEMAND CHAIN MANAGEMENT

(75) Inventors: Lorenzo Danesi, Richmond Hill (CA); Randal May, Barrie (CA); Zhenrong Li, Mississauga (CA); Alnasir Ladha, Marhham, CA (US)

(73) Assignee: Teradata US, Inc., Dayton, OH (US)

(*) Notice: Subject to any disclaimer, the term of this patent is extended or adjusted under 35 U.S.C. 154(b) by 1108 days.

(21) Appl. No.: 12/338,597

(22) Filed: Dec. 18, 2008

(65) Prior Publication Data

US 2010/0161647 A1    Jun. 24, 2010

(51) Int. Cl.
*G06F 17/30* (2006.01)
*G06Q 10/06* (2012.01)

(52) U.S. Cl.
CPC ............ *G06F 17/3048* (2013.01); *G06Q 10/06* (2013.01)

(58) Field of Classification Search
CPC .................................................. G06F 17/3048
See application file for complete search history.

(56) References Cited

U.S. PATENT DOCUMENTS

| | | | |
|---|---|---|---|
| 5,822,749 A | * | 10/1998 | Agarwal |
| 6,115,703 A | | 9/2000 | Bireley et al. |
| 6,598,119 B2 | | 7/2003 | Becker et al. |
| 6,725,265 B1 | | 4/2004 | Challenger et al. |
| 6,789,170 B1 | | 9/2004 | Jacobs et al. |
| 6,941,310 B2 | * | 9/2005 | Ahad et al. |
| 7,395,258 B2 | | 7/2008 | Altinel et al. |
| 7,406,464 B2 | | 7/2008 | Kasten et al. |

* cited by examiner

*Primary Examiner* — Usmaan Saeed
*Assistant Examiner* — Paul Kim
(74) *Attorney, Agent, or Firm* — Schwegman Lundberg & Woessner, P.A.; Randy L. Campbell, Jr.

(57) ABSTRACT

Demand Chain Management (DCM) refers to a suite of analytical applications for retail business, that provides retailers with the tools they need for product demand forecasting, planning and replenishment. The reliable development and user-friendly interface of DCM applications ensures improved customer satisfaction, increased sales, improved inventory turns and significant return on investment. The present subject matter provides a self-contained reusable smart cache component for DCM development and interface. The smart cache component gives a DCM developer the ability to automatically have a configurable amount of information temporarily stored in readily available memory on an application server. The information can be retrieved in a high speed fashion without the need for additional calls to the original location of the information.

10 Claims, 4 Drawing Sheets

US 9,311,358 B2

SMART CACHE COMPONENT FOR DEMAND CHAIN MANAGEMENT

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the code listing as described below and in any drawings hereto: Copyright© 2008, Teradata, Inc. All Rights Reserved.

BACKGROUND

Accurately determining demand forecasts for products is a paramount concern for retail organizations. Demand forecasts are used for inventory control, purchase planning, work force planning, and other planning needs of organizations. Inaccurate demand forecasts can result in shortages of inventory that are needed to meet current demand, which can result in lost sales and revenues for the organizations. Conversely, inventory that exceeds a current demand can adversely impact the profits of an organization. Excessive inventory of perishable goods may lead to a loss for those goods, and heavy discounting of end of season products can cut into gross margins.

Demand Chain Management (DCM) refers to a suite of analytical applications for retail business, that provides retailers with the tools they need for product demand forecasting, planning and replenishment. DCM assists retailers in accurately forecasting product sales at the store/SKU (Stock Keeping Unit) level to ensure high customer service levels are met, and inventory stock at the store level is optimized and automatically replenished.

SUMMARY

The reliable development and user-friendly interface of DCM applications ensures accurate and timely consumer demand forecasting, which delivers improved customer satisfaction, increased sales, improved inventory turns and significant return on investment.

According to certain embodiments described herein, DCM development and interface are improved by using a self-contained reusable smart cache component to give a developer the ability to automatically have a configurable amount of information temporarily stored in readily available memory on an application server. The information can be retrieved in a high speed fashion without the need for additional calls to the original location of the information

DETAILED DESCRIPTION

Figure 1:
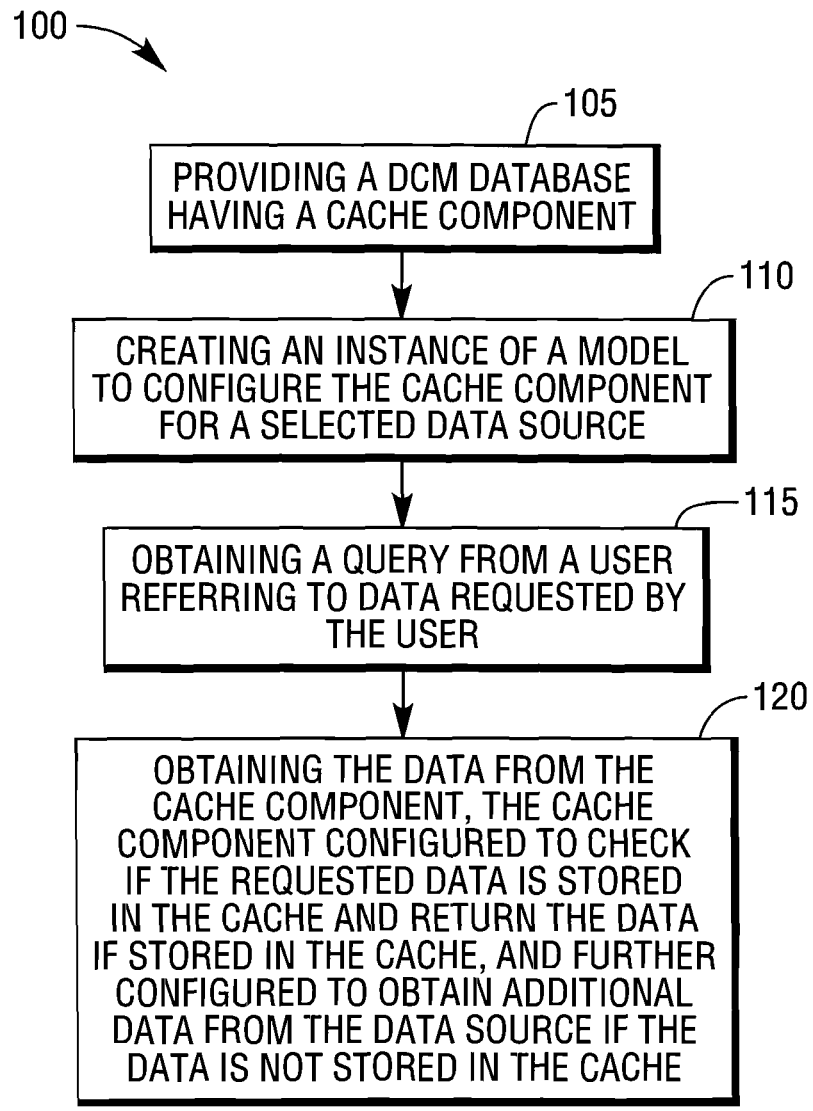
FIG. 1 illustrates a method for providing a DCM solution having a cache component, according to various embodiments.

This disclosure describes certain novel techniques for and further improvements to development of demand modeling or forecasting software. Forecasts are used to predict the demand for certain products at given locations in order to increase or maximize sales while keeping storage and other costs low. The reliable development and user-friendly interface of DCM applications ensures accurate and timely consumer demand forecasting, which delivers improved customer satisfaction, increased sales, improved inventory turns and significant return on investment.

Demand Chain Management

Demand Chain Management (DCM) refers to a suite of analytical applications for retail business, that provides retailers with the tools they need for product demand forecasting, planning and replenishment. DCM assists retailers in accurately forecasting product sales at the store/SKU (Stock Keeping Unit) level to ensure high customer service levels are met, and inventory stock at the store level is optimized and automatically replenished. DCM helps retailers anticipate increased demand for products and plan for customer promotions by providing the tools to do effective product forecasting through a responsive supply chain.

DCM is part of a data warehouse solution for the retail industries, and in an embodiment includes modules for contribution, seasonal profile, demand forecasting, promotions management, automated replenishment, time phased replenishment, allocation, load builder and capacity management. A demand forecasting module provides store/SKU level forecasting that responds to unique local customer demand. This module considers both an item's seasonality and its rate of sales (sales trend) to generate an accurate forecast. The module continually compares historical and current demand data and utilizes several methods to determine the best product demand forecast.

DCM models historical sales data to forecast future demand of products. Generating responsive demand forecasts depends upon the accurate calculation of Seasonal Profiles and Average Rate of Sale (ARS) for retail products. DCM utilizes adaptive models to calculate ARS weekly at the product/location level. Once the ARS calculations are complete, the DCM application chooses the appropriate model for the next forecasting period, based on the lowest Average Forecast Error (AFE). Store forecasts can thereafter be used to order the appropriate amounts of products from warehouse or Distribution Centers (DC) to meet customer demand.

Smart Cache Component

The reliable development and user-friendly interface of DCM applications ensures accurate and timely consumer demand forecasting, which delivers improved customer satisfaction, increased sales, improved inventory turns and significant return on investment. According to certain embodiments described herein, DCM development is improved by using a self-contained reusable smart cache component ("cache component") to give a developer the ability to automatically have a configurable amount of information temporarily stored in readily available memory on an application server. The information can be retrieved in a high speed fashion without the need for additional calls to the original location of the information In a DCM user application, a user is displayed large lists of information on a screen one page at a time. In the prior art, when the user navigates from one page to another, the original mechanism of obtaining the information is run again, and the developer is responsible for only displaying the information on the page the user requested. This leads to performance problems, decreased quality, increased development time, and reduced flexibility.

Due to the extent of DCM's database, some queries become complicated, and can take several seconds to run. In the prior art, every time a user makes a request to see another page of information, the entire query is re-run, and a new subset of information is displayed. If the query takes 5 seconds to run and display information, these 5 seconds are wasted every time the user requests a new page. The present subject matter provides a DCM smart cache component which eliminates subsequent calls to the database by storing a configurable number of pages of data in memory. When the user requests an additional page of data, the request is given to the component, the information is found in memory, and displayed to the user. If the information is not available, the component will request additional information from the original source.

The cache component itself is self-contained and reusable so once the code has been tested it is simply re-used by developers as needed. This ensures that the code it always up to date for all users accessing the component and allows developers to make only one change to that component when needed rather than making many changes throughout the software.

In DCM software, every developer is required to retrieve the information, and display it to the user. Any subsequent requests are also the responsibility of the developer. In using the smart cache component, the developer can just tell the component how to access the original source of the information, and the component handles the rest. So, in the case of structured query language (SQL), the developer configures the component with the SQL, and the actual retrieval of the information from the database is the responsibility of the component.

The component is highly flexible, allowing the storage of any types of data, for any purpose. DCM can use the smart cache component for the purposes of storing large lists of information that can be viewed by the user in a page-able grid, but this is one of the many uses for the component. The smart cache component improves development time and enhances the quality of the Demand Chain Management suite of applications.

In the prior art, DCM developers were responsible for the coding of data storage and retrieval for each screen. Each developer had various ways of working with the data so consistency throughout the platform was difficult to maintain. The smart cache component is a centralized component which allows developers to have information stored and retrieved automatically.

The developer creates an instance of a model, in various embodiments. Types of models that cover data from different sources include: java collection, hibernate and SQL models. Some models are used to interface between data models and to contain methods that are common to all models. In the case of a collection of java objects, a list of objects is given to the model. Hibernate models are instantiated with a hibernate query language (HQL) string. In order to set up a query model, the developer provides a structured query language (SQL) statement. For hibernate and SQL Models, it is the responsibility of the smart cache component to retrieve and temporarily store the information.

Regardless of the type of model used, the developer provides the smart cache component information such as number of rows per page, number of forward pages to retain, and the number of backward pages to retain. Forward pages are subsequent pages relative to the current page. Thus, if the user is looking at data for page 5, forward pages are 6, 7, 8 . . . . Conversely, backward pages are pages previous to the current page. For example, for page 5, Backward Pages are 4, 3, 2 . . . . These values are used when the smart cache component stores information to restrict the amount of data stored, so memory is not used excessively. When the smart cache component has a request for more information, it checks to see if the data is stored within the cache component. If the requested information is stored, it is returned. If not, the component will obtain more information from the original source. Due to the self-contained nature of the component, establishing bug free and centralized code is straight-forward.

Methods for Providing a Smart Cache Component

FIG. 1 illustrates a method 100 for providing a DCM solution having a cache component, according to various embodiments. The machine-implemented method includes providing a DCM database having a cache component, at 105, and creating an instance of a model to configure the cache component for a selected data source, at 110. The method embodiment further includes obtaining a query from a user referring to data requested by the user, at 115, and obtaining the data from the cache component, at 120. The cache component is configured to check if the requested data is stored in the cache and return the data if stored in the cache, and further configured to obtain additional data from the data source if the data is not stored in the cache.

According to various embodiments, the method further includes displaying the requested data for the user. Creating an instance of a model includes creating a java collection model, a hibernate model or a structured query language (SQL) model, in various embodiments. Other types of models include an interface model configured to define design rules that other models follow and an abstract model adapted to contain routines common to all models. The models are described below with reference to FIG. 3B, and additional types of models can be used without departing from the scope of this disclosure. In various embodiments, the cache component is provided with a number of rows per page, a number of forward pages to retain and/or a number of backward pages to retain.

Figure 2:
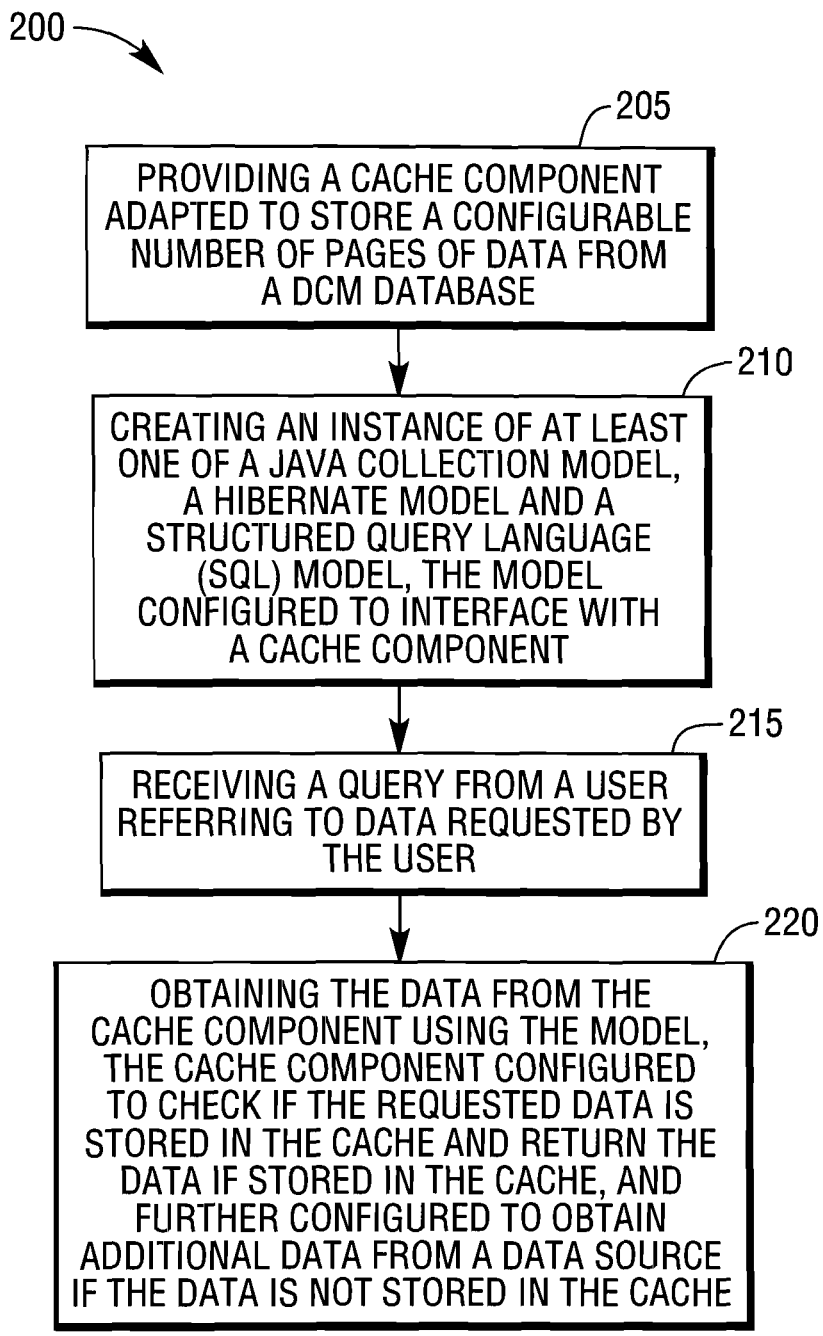
FIG. 2 illustrates a method for providing a cache component adapted to store a configurable number of pages of data from a DCM database, according to various embodiments.

FIG. 2 illustrates a method 200 for providing a cache component adapted to store a configurable number of pages of data from a DCM database, according to various embodiments. The machine-implemented method includes providing a cache component adapted to store a configurable number of pages of data from a DCM database, at 205, and creating an instance of at least one of a java collection model, a hibernate model and a structured query language (SQL) model, the model configured to interface with a cache component, at 210. The method embodiment also includes receiving a query from a user referring to data requested by the user, at 215, and obtaining the data from the cache component using the model, at 220. The cache component is configured to check if the requested data is stored in the cache and return the data if stored in the cache, and further configured to obtain additional data from a data source if the data is not stored in the cache.

According to various embodiments, the method also includes creating an interface model configured to define design rules that other models follow. The method further includes creating an abstract model adapted to contain routines common to all models, in various embodiments. In various embodiments, the cache component is provided with a number of rows per page, a number of forward pages to retain and/or a number of backward pages to retain. The method further includes displaying the requested data for the user, in an embodiment.

Various embodiments of the discussed methods for providing a cache component can be implemented using the various systems discussed below.

System Having a Smart Cache Component

Figure 3A:
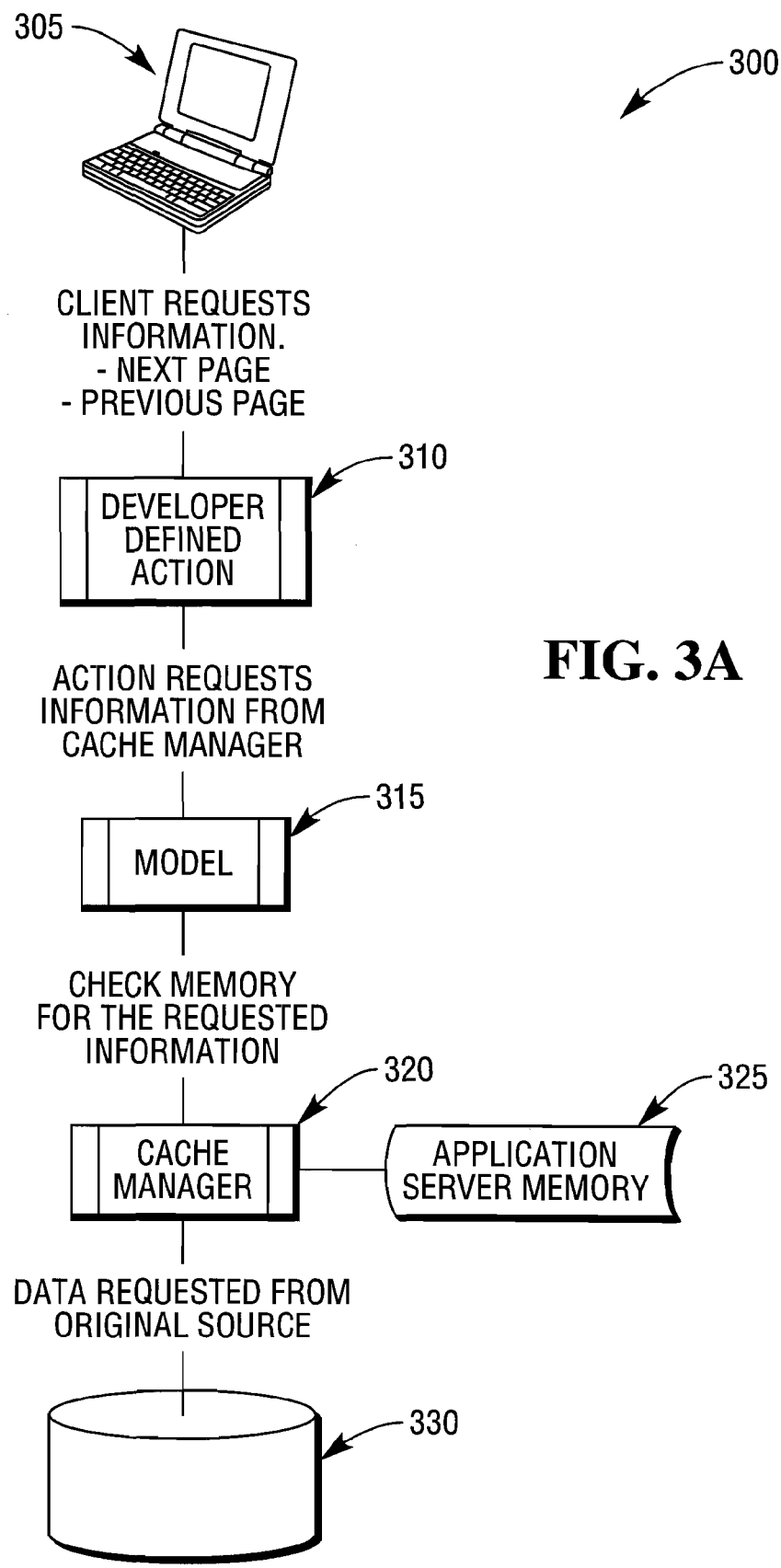
FIG. 3A illustrates a system having a cache component adapted to store a configurable number of pages of data from a DCM database, according to various embodiments.

FIG. 3A illustrates a system 300 having a cache component adapted to store a configurable number of pages of data from a DCM database, according to various embodiments. The system 300 is implemented as instructions within one or more machine accessible or computer-readable medium. The system 300 implements, among other things, the methods 100 and 200 of the FIGS. 1 and 2.

The system 300 includes a database 330 comprising a plurality of entries corresponding to DCM data, and a data model module 315 configured to receive an action requesting data from the database and further configured to process the action and attempt to obtain the requested data from a cache. The system 300 also includes a cache manager module 320 configured to check if the requested data is stored in the cache (or application server memory 325) based on instructions from the data model module 315, and return the data if stored in the cache. The cache manager module 320 is further configured to obtain additional data from the database 330 if the data is not stored in the cache.

According to various embodiments, the system 300 also includes application server memory 325 that interfaces with the cache manager module 320, the server memory containing next or previous pages, for example. When a client, or user, requests information (such as by selecting a next page or previous page for display on a user system 305), a developer defined action module 310 interfaces with the data model module 315 to request information from the cache manager 320. According to various embodiments, the data model module 315 includes a java collection model module, a hibernate model module, or a structured query language (SQL) model module. Other types of models include an interface model configured to define design rules that other models follow and an abstract model adapted to contain routines common to all models. The models are described below with reference to FIG. 3B, and additional types of models can be used without departing from the scope of this disclosure.

Figure 3B:
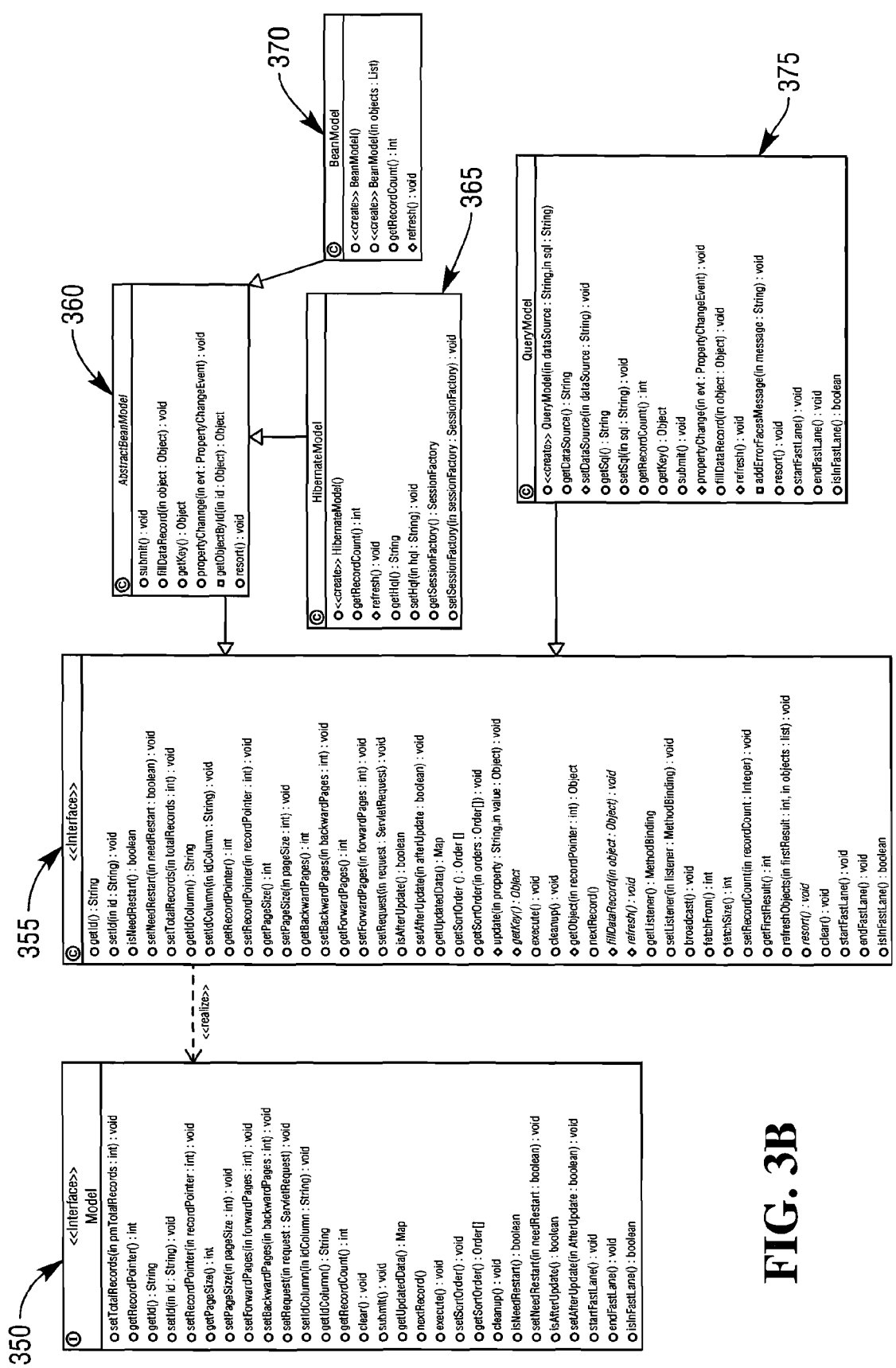
FIG. 3B illustrates models used with a cache component adapted to store a configurable number of pages of data from a DCM database, according to various embodiments.

FIG. 3B illustrates models used with a cache component adapted to store a configurable number of pages of data from a DCM database, according to various embodiments. Interface model 350 (Model.java) defines rules that any and all models follow. It declares that all models contain methods that control a number of records per page, forward pages, backward pages, and returning updated records. Abstract model 355 (AbstractModel.java) contains methods that are common to all models. This is where calculations are done relating to number of records retrieved, processing updated values, checking server memory to get the next or previous pages, and triggering the model to retrieve more information. Java collection model, or abstract bean model 360 (AbstractBeanModel.java), is the super class for models that contain plain old java objects (POJOs). From this class, a model can be resorted, a key can be retrieved, and any changes to values in the cache are maintained. Any object that has been mapped to a database with a hibernate mapping file can be cached using hibernate model 365 (HibernateModel.java). Application programming interfaces (APIs) for setting the hibernate query language (HQL), and for ordering the data to be refreshed reside in the hibernate model. In java object list model, or bean model 370 (BeanModel.java), any java language list of objects can be cached. Structured query language (SQL) model, or query model 375 (QueryModel.java) allows for caching of information from the database. The query model 375 allows a developer to set the SQL for the data, the data source to retrieve the data from, and records any changes that have been made to the data. Additional types of models can be used without departing from the scope of this disclosure.

Certain embodiments of the inventions described in this disclosure provide advantages over the prior art. For example, some embodiments provide improved DCM system performance. The smart cache component is flexible, allowing storage of any type of data for any purpose. In addition, the present subject matter provides decreased development time and increased quality of the DCM suite of applications. It will be understood that other advantages can be realized utilizing the novel features described in this disclosure, and that not every advantage or feature described herein will be present in every embodiment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A machine-implemented method, comprising:
providing, with a processor, a cache component adapted to store a configurable number of pages of data from a Demand Chain Management (DCM) database, wherein each page of data is configured to be displayed on a display separate from one another;
initializing, with the processor, the cache component to store a predetermined number of pages of data from the DCM database, wherein the predetermined number of pages is less than a total amount of page storage capacity of the cache component;
creating, with the processor, an instance of at least one of a java collection model, a hibernate model and a Structured Query Language (SQL) model, the model configured to interface with a cache component;
receiving, with the processor, a query from a user referring to data requested by the user; and
obtaining, with the processor, the data from the cache component using the model, the cache component configured to check if the requested data is included in the predetermined number of pages of data stored in the cache component and return the data if stored in the cache component, and further configured to obtain additional data from a data source if the data is not stored in the cache component.

2. The method of claim 1, further comprising:
creating, with the processor, an interface model configured to define design rules that other models follow.

3. The method of claim 1, further comprising:
creating, with the processor, an abstract model adapted to contain routines common to all models.

4. The method of claim 1, further comprising:
providing, with the processor, the cache component with a number of rows per page.

5. The method of claim 1, further comprising:
providing, with the processor, the cache component with a number of forward pages to retain.

6. The method of claim 1, further comprising:
providing, with the processor, the cache component with a number of backward pages to retain.

7. A system, comprising:
a memory device configured to store a database comprising a plurality of entries corresponding to Demand Chain Management (DCM) data;
a processor in communication with the memory device;
a data model module executable by the processor to receive an action requesting data from the database and further configured to process the action and attempt to obtain the requested data from a cache, wherein the cache is initialized to store a predetermined amount of data from the database, wherein the predetermined amount of data is less than a total amount of data storage capacity of the cache; and
a cache manager module executable by the processor to check if the requested data is contained in the predetermined amount of data stored in the cache based on instructions from the data model module, and return the data if stored in the cache, and further configured to obtain the data from the database if the data is not stored in the cache.

8. The system of claim 7, wherein the data model module includes a java collection model module.

9. The system of claim 7, wherein the data model module includes a hibernate model module.

10. The system of claim 7, wherein the data model module includes a Structured Query Language (SQL) model module.

* * * * *